US010741093B2

(12) United States Patent
Meisner

(10) Patent No.: US 10,741,093 B2
(45) Date of Patent: Aug. 11, 2020

(54) AUTOMATED DETERMINATION OF DEGREE OF ITEM SIMILARITY IN THE GENERATION OF DIGITIZED EXAMINATIONS

(71) Applicant: ACT, Inc., Iowa City, IA (US)

(72) Inventor: Richard Meisner, Iowa City, IA (US)

(73) Assignee: ACT, INC., Iowa City, IA (US)

( * ) Notice: Subject to any disclaimer, the term of this patent is extended or adjusted under 35 U.S.C. 154(b) by 0 days.

(21) Appl. No.: 16/517,024

(22) Filed: Jul. 19, 2019

(65) Prior Publication Data

US 2019/0340949 A1 Nov. 7, 2019

Related U.S. Application Data

(63) Continuation of application No. 15/618,971, filed on Jun. 9, 2017, which is a continuation-in-part of application No. 15/619,421, filed on Jun. 9, 2017.

(51) Int. Cl.
*G09B 7/02* (2006.01)
*G06F 40/30* (2020.01)
*G06F 40/284* (2020.01)

(52) U.S. Cl.
CPC ............. *G09B 7/02* (2013.01); *G06F 40/284* (2020.01); *G06F 40/30* (2020.01)

(58) Field of Classification Search
CPC ...................................................... G09B 7/02
USPC ........................................................ 434/353
See application file for complete search history.

(56) References Cited

U.S. PATENT DOCUMENTS

| 9,037,967 | B1 | 5/2015 | Al-Jefri |
| 9,542,383 | B2 | 1/2017 | Kim |
| 9,740,769 | B2 | 8/2017 | Bhagwat |
| 2002/0156763 | A1 | 10/2002 | Marchisio |
| 2003/0048308 | A1 | 3/2003 | Friedlander |
| 2003/0149692 | A1 | 8/2003 | Mitchell |
| 2004/0175687 | A1 | 9/2004 | Burstein |
| 2005/0142529 | A1 | 6/2005 | Andreyev |
| 2012/0131015 | A1 | 5/2012 | Al Badrashiny |
| 2012/0323573 | A1 | 12/2012 | Yoon |
| 2013/0110498 | A1 | 5/2013 | Bekkerman |
| 2013/0117368 | A1 | 5/2013 | Dozier |
| 2014/0093845 | A1 | 4/2014 | Kim |
| 2014/0317032 | A1 | 10/2014 | Haberman |
| 2015/0154174 | A1 | 6/2015 | Hoover |
| 2015/0194147 | A1 | 7/2015 | Yoon |
| 2015/0243181 | A1 | 8/2015 | Somasundaran |

(Continued)

*Primary Examiner* — Kesha Frisby
(74) *Attorney, Agent, or Firm* — Sheppard, Mullin, Richter & Hampton LLP

(57) ABSTRACT

A computer implemented method for identifying and removing similar examination items in a digital examination includes obtaining, with an examination evaluation server, a digital examination with a plurality of examination items, tokenizing a first examination item of the plurality of examination items into a first set of n-grams, tokenizing a second examination item of the plurality of examination items into a second set of n-grams, generating a first item vector from the first set of n-grams, generating a second item vector from the second set of n-grams, generating multiple item congruence values for corresponding similarity dimensions by comparing the first item vector with the second item vector, and identifying that the first and second examination items are a potential enemy item pair if one or more of the item congruence values exceed corresponding threshold values.

20 Claims, 12 Drawing Sheets

(56) References Cited

U.S. PATENT DOCUMENTS

2015/0254229 A1 9/2015 Beigman Klebanov
2017/0140659 A1 5/2017 Alsanie

AUTOMATED DETERMINATION OF DEGREE OF ITEM SIMILARITY IN THE GENERATION OF DIGITIZED EXAMINATIONS

CROSS-REFERENCE TO RELATED APPLICATIONS

This application is a continuation-in-part of and claims the benefit of U.S. patent application Ser. No. 15/619,421 filed on Jun. 9, 2017, which is a continuation of U.S. patent application Ser. No. 15/618,971 filed on Jun. 9, 2017, the contents of both of which are hereby incorporated herein by reference in its entirety.

TECHNICAL FIELD

The disclosed technology relates generally to electronic testing, and more particularly various embodiments relate to systems and methods for automated determination of similarity between digitized examinations.

BACKGROUND

Digitized examinations may be generated by compiling multiple examination items. For example, an item may be a question or problem statement. Items may be compiled from a repository, e.g., a relational database or other electronic storage medium or data store. Items may be categorized by different characteristics, such as field, topic, and/or difficulty of the content. Many times, digitized examinations may be limited or fixed in length, i.e., the number of items presented to a test subject. Nevertheless, in many cases, it is a goal to present a test subject with a broad range of non-cumulative items for the purpose of assessing a sufficient breadth and scope of the test subject's skill and/or knowledge. Accordingly, it is desirable to exclude repeated, cumulative, duplicative, and/or highly similar items in any given digitized examination form. Undesirably similar questions may be referred to as "enemy items." For example, pairs of enemy items may be linguistically similar, lexically similar, syntactically similar, and/or semantically similar. However, identifying enemy items, when done manually, may be relatively subjective in nature and time consuming, such that resulting digital examination forms may be relatively non-uniform, and difficult to create.

Traditional technology does not provide an automated and/or objective mechanism for identifying enemy items for removal from digitized examination forms. For example, checking for the presence of enemy items on a newly assembled fixed-length test form has been a labor-intensive process. For a complete check, a human content expert would need to compare every item to every other item on the test form. For a 60-item form, this involves $$\binom{60}{2} = 1{,}770$$

pairwise item comparisons. The problem of finding all enemy item pairs in a larger pool of items is far more daunting. A pool of 1,000 items contains $$\binom{1{,}000}{2} = 499{,}500$$

distinct pairs of items, and it's impossible to humanly check every pair for the degree of item similarity between the two. As assessment increasingly evolves from fixed-length forms to computer-adaptive administrations (items being selected from the pool "on the fly" in response to ongoing examinee performance), it becomes not just desirable but essential to find a way to automatically, quickly, and objectively (at the time of administration) determine the degree of similarity between any two given items drawn from an item pool.

BRIEF SUMMARY OF EMBODIMENTS

The present disclosure provides a system and method for objectively and efficiently determining the degree of linguistic, lexical, syntactic, and/or semantic similarity for the purpose of objectively identifying and removing enemy items. As used herein, lexical similarity is an evaluation of the overlap of identical or substantially similar words or numbers, syntactic similarity is an evaluation of similar structure within the item, semantic similarity is an evaluation of similarity in meaning, and content similarity is an evaluation of similarity in the content being tested by the item. Embodiments of the present solution evaluate information about similarity in each dimension of similarity described above using a vector (1-dimensional array) and its sub-vectors. The evaluation may be done using natural language processing (NLP)-based methodologies of converting n-grams from each item into vectors and calculating vector quantities (i.e., a congruence value) for each of the dimensions. The dimension-specific congruence values (i.e., a cosine similarity value) can be compared with a threshold value to determine if an item is a potential enemy item. In some embodiments, a multi-dimensional array of congruence values may be compared with a threshold value and/or reference value array to determine whether the pair of examination items is an enemy pair. In some embodiments, a predictive machine-learning model may be trained to predict the degree of similarity and/or existence of an enemy pair of examination items, the predictive model being capable of adapting based on tuning input from a user interface.

Some embodiments of the disclosure provide a computer implemented method for identifying and removing similar examination items in a digital examination. The method may include obtaining, with an examination evaluation server, a digital examination. The digital examination may include a plurality of examination items. For example, an examination item may be an examination question or set of questions. The question may be a reading comprehension question, an essay topic, a short answer question, a problem statement requiring a fill-in-the-blank and/or multiple choice response, or other types of examination questions.

The method may include tokenizing two or more examination items from the digital examination into a respective sets of n-grams. In some embodiments, the method includes tokenizing a first examination item into a first set of n-grams and a second examination item into a second set of n-grams. The method may also include generating item vectors from the sets of n-grams. For example, the method may include generating a first item vector from the first set of n-grams and a second item vector from the second set of n-grams. For example, the item vector may be an array characterizing the n-grams from the item on one or more different types of similarity: semantic, syntactic, lexical, and/or content.

Some embodiments of the method may include generating an item congruence value by comparing two or more item vectors. For example, the item congruence value may be based on a comparison of the first set of n-grams and the second set of n-grams. The method may also include identifying that the first and second examination items are a potential enemy item pair if the item congruence value exceeds a threshold value. For example, the enemy item may be a pair of similar examination items.

In some examples, the item congruence value is a cosine of an angle between the first item vector and the second item vector. In some examples, the item congruence value may also include a weighting coefficient applied to the cosine of the angle between the first item vector and the second item vector. Congruence values may be generated for multiple dimensions of similarity, including without limitations, lexical, syntactic, semantic, and construct similarity.

In some embodiments, the method may include determining the threshold value for identifying enemy item pairs using a predictive machine learning model. For example, the predictive machine learning model may include obtaining a training set of digital examinations, wherein each digital examination of the training set of digital examination comprises multiple training examination items. The method may also include determining, for pairs of training examination items, training item congruence values and obtaining, from a graphical user interface, indications as to whether training examination items from the pairs of training examination items are enemy items. The method may also include determining the threshold value based on the congruence values and the indications. In some examples, the machine learning model may be a convolutional neural network, a gradient boosted learning tree, or other machine learning, predictive, and/or deep learning algorithms as known in the art.

In some examples, generating an item congruence value includes evaluating similarity between item vectors relative to a target similarity dimension. In some embodiments, this comparison may be implemented using a natural language processing (NLP) algorithm. In some embodiments, the comparison may be implemented using a machine-learning algorithm.

In some examples, the target similarity dimension may include semantic similarity, syntactic similarity, lexical similarity, or content similarity. In some examples, congruence values may be generated for multiple and/or all target similarity dimensions and evaluated against threshold congruence values for each respective target similarity dimension.

In some examples, identifying that the first and second examination items are a potential enemy item pair may include generating an array of congruence values. The congruence values may be generated across different similarity dimensions. For example, the array of congruence values may include a semantic congruence value, a syntactic congruence value, a lexical congruence value, and a content congruence value. Some examples of the method include applying a weighting coefficient to the congruence value, the weighting coefficient being based on the target similarity dimension.

In some embodiments, the method includes determining that the potential enemy item pair is a confirmed enemy item pair, e.g., via a user interface, and removing the one of the examination items of the confirmed enemy item pair from the digital examination. In some examples, determining that the potential enemy item is a confirmed enemy item includes displaying, on a graphical user interface, the potential enemy item and obtaining, from the graphical user interface, an indication that the potential enemy item is a confirmed enemy item. For example, the method may include displaying, on a graphical user interface, the potential enemy item and the array of congruence values, obtaining, from the graphical user interface, an indication that the potential enemy item is a confirmed enemy item, and removing the confirmed enemy item from the digital examination.

Embodiments of the present disclosure also provide a system for enemy items from a digital examination. For example, the system may include an examination evaluation server, a data store, and/or a graphical user interface. The examination evaluation server may include a processor and a non-transitory computer readable medium with computer executable instructions embedded thereon. The computer executable instructions may be configured to cause the processor to obtain a digital examination comprising a plurality of examination items, tokenize a first examination item of the plurality of examination items into a first set of n-grams, tokenize a second examination item of the plurality of examination items into a second set of n-grams, generate a first item vector from the first set of n-grams, generate a second item vector from the second set of n-grams, evaluate similarity between the item vector and the second item vector relative to a first target similarity dimension to generate a first item congruence value, evaluate similarity between the first set of n-grams and the second set of n-grams relative to a second target similarity dimension to generate a second item congruence value, store the first and second item congruence values into an item congruence array located on the data store, and identify the first and second examination items are a potential enemy item pair if the first item congruence value exceeds a first threshold value and the second item congruence value exceeds a second threshold value. In some examples, the computer executable instructions may be configured to cause the graphical user interface to display the digital examination without the potential enemy item. Some examples include generating additional item congruence values across multiple similarity dimensions for the first and second item vectors. For example, similarity dimensions may include semantic, lexical, syntactical, and/or construct dimensions of similarity. Threshold congruence values may be input by a user, hard coded, and/or generated by the system for each respective similarity dimension. In some embodiments, the system may generate a multi-dimensional array of congruence values for a set of item vectors. The array of multi-dimensional congruence values may be compared against one or more threshold congruence values, or an array of reference and/or threshold congruence values.

In some embodiments of the system, the first item congruence value may be a cosine of an angle between the first item vector and the second item vector when evaluated relative to the first target similarity dimension and the second item congruence value may be a cosine of an angle between the first item vector and the second item vector when evaluated relative to the second target similarity dimension.

In some examples, the computer executable instructions may be configured to cause the processor to determine the first and second threshold values using a machine learning logical circuit. The machine learning logical circuit may be configured to obtain a training set of digital examinations, wherein each digital examination of the training set of digital examinations comprises multiple training examination items, determine, for pairs of training examination items, training item congruence values, obtain, from a graphical user interface, indications as to whether training examination items from the pairs of training examination items are enemy items, and determine the threshold value based on the congruence values and the indications. The machine learning logical circuit may be further configured to apply a convolutional neural network, a gradient boosted learning tree, or other machine learning, predictive, and/or deep learning algorithms.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
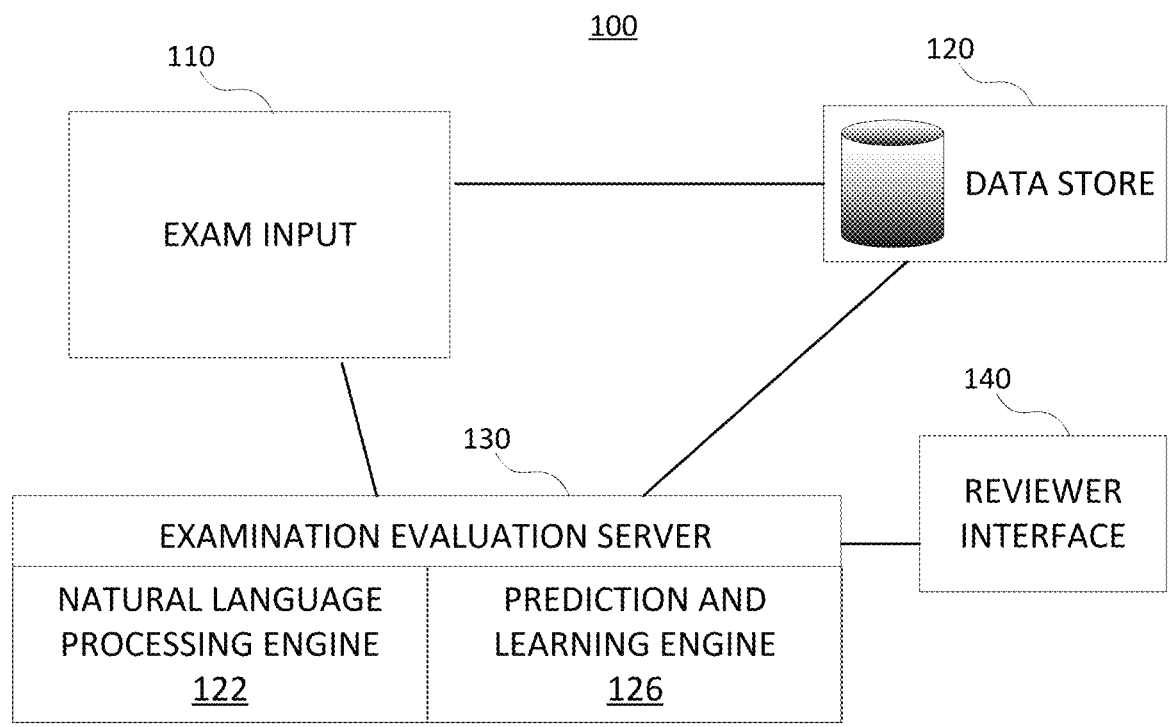
FIG. 1 illustrates an example system for automated examination scoring, consistent with embodiments disclosed herein.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward a system and method for automated determination of a degree of item similarity in the generation of digitized examinations. More specifically, examples of the disclosed technology apply machine learning algorithms to an automated determination of similarity between digitized examinations. Embodiments of the system include a pattern recognition system configured to detect the presence of n-grams within an examination response. Examination items may be tokenized into n-grams, and the n-grams may be used to generate item vectors respective to each examination item. For example, a three-word string may be characterized as a "trigram," a four-word string may be characterized as a "4-gram," and so on.

In some embodiments, the method includes generating item vectors for sets of tokenized n-grams from examination item pairs. The method may further include generating a set of congruence values, e.g., cosine similarity values. For example, each cosine similarity value may be a function of an item vector pair.

In some examples, the method may include identifying a set of large cosine similarity values, wherein each large cosine similarity value is greater than any cosine similarity value not included in the set of large cosine similarity values. For example, there may be m first average item vectors and n second average item vectors, and an example method may include calculating the cosine similarity between each of the m first average semantic vectors and n second average semantic vectors, resulting in m×n cosine similarity values. The method may then include averaging the p greatest of those m×n cosine similarity values, where p is the maximum of (m, n). The average of the p greatest sentence similarity quantities is then used as the similarity quantity. The similarity quantity may be displayed, along with a first examination item and/or a second examination item, in a user interface, e.g., a graphical user interface. The method may further include storing the similarity quantity in a machine learning database.

Some embodiments disclosed herein provide a system for examination scoring that includes an examination evaluation server, a reviewer interface, and a data store. For example, the examination evaluation server may include a processor and a non-transitory computer readable medium with computer executable instructions embedded thereon. The computer executable instructions may be configured to cause the processor to receive a language corpus comprising a plurality of corpus words and derive, for each corpus word, a corpus sematic vector within a multi-dimensional semantic vector space, receive a first examination response, and tokenize the first examination response into a plurality of first response words. The computer executable instructions may also be configured to cause the processor to identify a set of matching first response words from the plurality of first response words, wherein each matching first response word matches a corpus word, and generate a set of first semantic vectors, wherein each first semantic vector corresponds to a matching first response word. The language corpus may include a base corpus and a supplemental corpus, the supplemental corpus being related to a predetermined topic.

In some embodiments, the computer executable instructions may be further configured to cause the processor to receive a second examination response, tokenize the second examination response into a plurality of second response words, identify a set of matching second response words from the plurality of second response words, wherein each matching second response word matches a corpus word; and identify a set of second semantic vectors, wherein each second semantic vector corresponds to a matching second response word. The second examination response may be an exemplar examination response. In some examples, the first examination response and the second examination response are pre-filtered to remove stop words and/or correct spelling errors.

In some embodiments, the method includes generating a first average semantic vector as an average of a subset of the set of first semantic vectors. The method may also include generating a second average semantic vector as an average of a subset of the set of second semantic vectors. For example, each subset may be a sentence or other segment of the examination response. In some examples, a first average semantic vector may be calculated corresponding to each sentence from the first examination response, and a second average semantic vector may be calculated from each sentence in the second examination response.

In some embodiments, the system generates a set of cosine similarity values. For example, each cosine similarity value may be a function of one of the first average semantic vectors and one of the second average semantic vectors. In some examples, the system may identify a set of large cosine similarity values, wherein each large cosine similarity value is greater than any cosine similarity value not included in the set of large cosine similarity values. For example, there may be m first average semantic vectors and n second average semantic vectors, and an example method may include calculating the cosine similarity between each of the m first average semantic vectors and n second average semantic vectors, resulting in m×n cosine similarity values. The method may then include averaging the p greatest of those m×n cosine similarity values, where p is the maximum of (m, n). The average of the p greatest sentence similarity quantities is then used as the response similarity quantity. The response similarity quantity may be displayed, along with the first examination response and/or the second examination response, in a user interface, e.g., a graphical user interface. The system may also store the response similarity quantity in a machine learning database.

To provide insight and quality assurance, characteristics of the automated examination scoring model may be queried. The GBT scoring model may be queried to produce a measure of the reduction in error attributable to each feature extracted from responses. Features extracted from responses may be arranged in descending order by this measure of error reduction to provide insights about what variables are the most important for determining an accurate estimate of the target score.

While determining the importance of features for accurate score estimates is useful, it may not provide an indication of the actual effect of particular values of features on the estimate in terms of the direction, e.g., whether an increase in feature value cause an increase or a decrease in the estimated score, or of the size of the effect. To determine these characteristics, the GBT scoring model may be queried to produce a visual indication of the effects of individual variables. The scoring model may be used to generate score estimates as the variable in question is varied across all observed values when the other variables are held constant at their real values for each response in the data. A user may observe the effect of a single variable on all individual responses to determine whether extensive, complex interactions are present, represented by a high level of variation in the trace lines. A user may also observe the average effect of a variable on responses to determine the size of the effect, in general, when the system varies the value of the variable across multiple observed values while the other variables are held constant at the average values observed across multiple responses in the data set.

FIG. 1 illustrates an example system for automated detection of item similarity 100. In other embodiments, system 100 may perform automated examination scoring. In some embodiments, system 100 includes an examination input device 110. For example, examination input device 110 may include a scanner, a computer, a tablet, a mobile device, or other electronic input devices and/or data storage devices as known in the art. The input device 110 may further include a graphical user interface, for example, to present an electronic examination to a user and accept responses to the examination. Digital examinations and/or examination responses may be obtained from input device 110. The responses may be in the form of multiple choice, short answer, essay, or other response formats as would be known in the art.

Exam input device 110 may communicatively couple to data store 120. Data store 120 may include a database housed on local storage, network attached storage, cloud-based storage, a storage area network, or other data storage devices as known in the art. Data store 120 may also include a repository of digital examinations, training digital examinations, examination items, and/or a vocabulary repository or corpus. For example, a corpus may be a dictionary or encyclopedia. In some examples, the corpus may be topic-specific, such as a corpus containing vocabulary specific to medicine, physics, chemistry, biology, history, literature, psychology, sociology, astronomy, or other topics as would be known in the art. The corpus may be made available to the examination evaluation server to derive semantic word vectors and to provide n-gram frequency lists relevant to a particular examination topic. In some embodiments, user-created corpuses may also be stored in data store 120.

Both exam input device 110 and data store 120 may be communicatively coupled to examination evaluation server 130. As used herein, communicatively coupled may mean a direct or indirect connection between or among the entities to exchange information (e.g., in the form of electrical or electromagnetic signals) with each other over a wired or wireless communication link. Examples of such a communication link can include a computer bus, a local area network, a wide area network, a wireless network, or other electronic or electromagnetic communication links.

Examination evaluation server 130 may include a computer processor and a non-transitory computer readable medium with computer executable instructions embedded thereon. The computer executable instructions may be configured to perform automated detection of item similarity in accordance with embodiments disclosed herein. In some embodiments, the computer executable instructions may be configured to perform response feature extraction, machine learning model training, and automated examination scoring as disclosed herein. For example, the computer executable instructions may be configured as a natural language processing (NLP) engine 122 and a prediction and learning engine 126. NLP engine 122 may be configured to receive examination items, item vector pairs, and/or examination responses from examination input device 110 or data store 120 and determine congruence values for given similarity dimensions for the item vector pairs. In some embodiments, the NLP engine may apply an item automated examination scoring routine, e.g., feature extraction, as disclosed herein. Prediction and learning engine 126 may be configured to perform a predictive determination of item similarity in accordance with embodiments disclosed herein. In some embodiments, the predictive learning engine may be configured to derive and modify a set of scoring rules and compare automated scoring results to manual scoring results entered through reviewer interface 140, and further configured to modify or calibrate a set of scoring rules applied by NLP engine 122.

Reviewer interface 140 may be a computer, a tablet, a mobile device, or other electronic input devices as known in the art. In some examples, reviewer interface 140 may include a graphical user interface configured to display examination items, congruence values, a congruence value array, indications of potential enemy item pairs, examination responses and enable a reviewer to score the examination responses. In some examples, the reviewer interface 140 may also accept reasons from the reviewer as to why particular scores were assigned to the examination. Those reasons may be relevant to or assist with iterative modification of the set of extracted response features. Reviewer interface 140 may also include a diagnostic interface to enable a reviewer to view an examination response that was scored by the examination evaluation server along with a learned decision tree indicating how a score was calculated (e.g., which response features were identified and how those features were weighted in deriving the overall score). Reviewer interface 140 may also include a configuration interface that enables a user to change settings and parameters used by examination evaluation server 130. For example, a user may manually add or remove response features, adjust machine learning parameters, enter corpuses or links thereto, or perform other related system tuning.

Figure 2A:
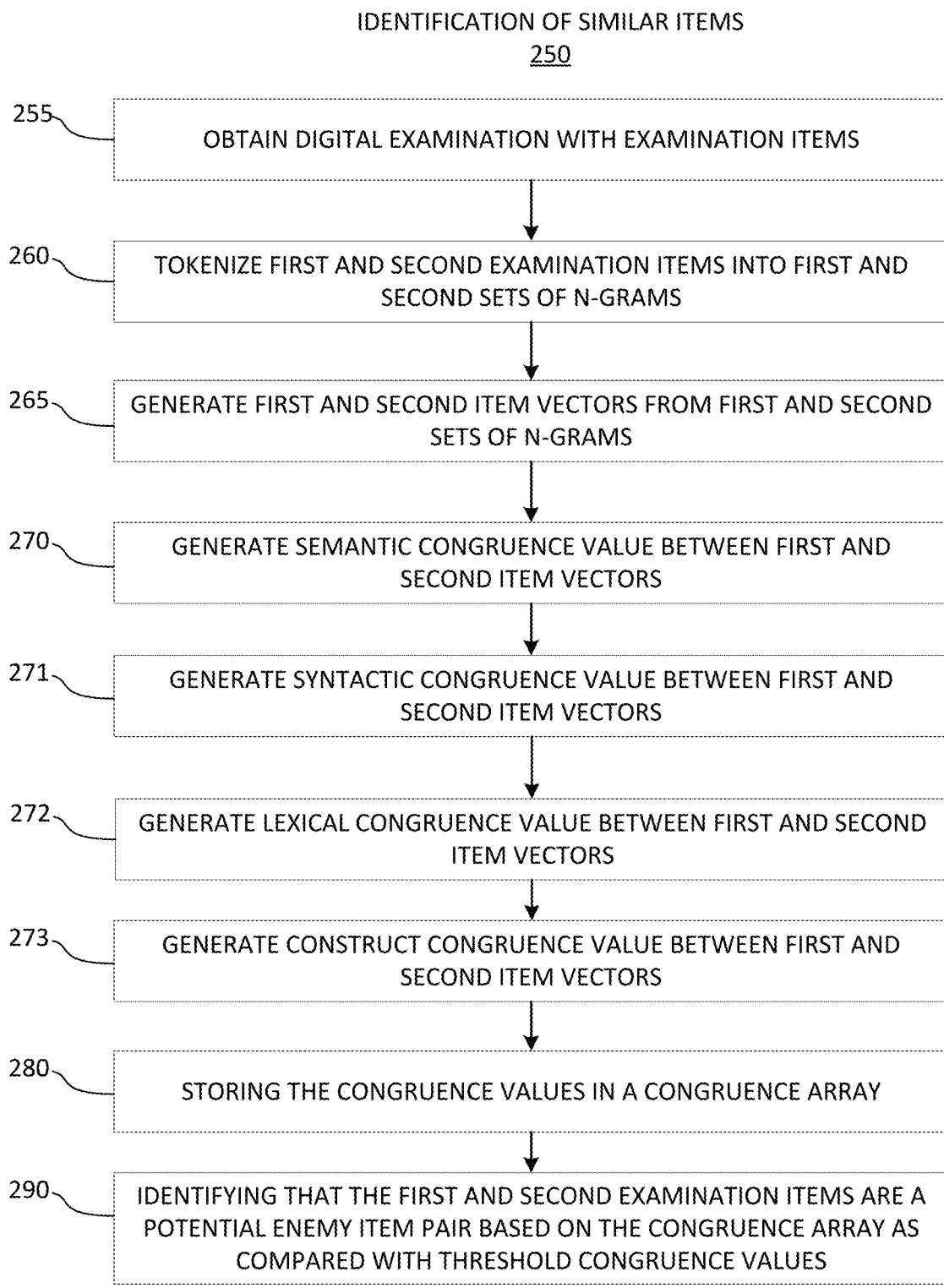
FIG. 2A is a flow chart illustrating an example method for identification of similar items, consistent with embodiments disclosed herein.

FIG. 2A is a flow chart illustrating an example method for identification of similar items 250. In some embodiments, the method 250 illustrated in FIG. 2A can be implemented to identify and remove enemy item pairs. An enemy item pair is a pair of examination items that are substantially similar such that they do effectively test for identical information and/or skill. In some embodiments, method 250 may include obtaining a digital examination at step 255. The digital examination may include a plurality of examination items. Examination items are questions and/or topics that provide a task for a test taker, e.g., to draft a responsive essay or short answer, fill in a blank, select a choice out of a set of multiple choices responsive to the question, read a passage and answer a question related to comprehension of the passage, or other examination inquiries. The digital examination may be a manually or automatically generated digital examination form. The digital examination may be obtained from a user interface, an input device such as a scanner, a data storage device, a cloud-based storage device, or other storage and/or input device.

Method 200 may also include tokenizing a first and second examination item selected from the digital examination at 260. The first and second examination items may be any two examination items selected from the digital examination. The selection of the two examination items may be selected sequentially, manually, or using an algorithm and/or random selection process. The examination items may then be tokenized into respective sets of n-grams (e.g., first and second sets of n-grams) that make up the respective examination item.

Method 200 may also include generating item vectors from respective n-gram sets (e.g., first and second item vectors) at 265. The item vectors may include an array of n-grams from the set of n-grams. The method may also include generating a semantic congruence value between a pair of item vectors (e.g., the first and second item vectors) at 270-273. The congruence value may be an angle, a cosine value, or other parameter quantifying the degree of similarity between the two item vectors of the pair of item vectors relative to a dimension of similarity. For example, dimensions of similarity may include sematic similarity (270), lexical similarity (271), syntactic similarity (272), and/or construct similarity (273). In some embodiments, two or more congruence values may be generated for a pair of item vectors, wherein the two or more congruence vectors are selected from different similarity dimensions. In some embodiments, four congruence values, each from a different similarity dimension, may be used.

In some embodiments, method 200 may also include storing the multi-dimensional congruence values generated in a congruence array at 280. The congruence array may be located on a data storage device.

Method 200 may also include identifying that the pair of examination items are a potential enemy item pair based on one or more of the congruence values and/or the congruence array as compared with respective threshold congruence values and/or a threshold or reference congruence array at 290. For example, threshold congruence values may be fixed values, hard coded, obtained from a parameter file and/or user input device, or generated by system 100. The threshold congruence values may be set relative to each respective similarity dimension. In some examples, the examination item pair may be determined to be a potential enemy item pair if one of the congruence values exceeds a threshold congruence value for the same dimension of similarity. In some examples, the examination item pair may be determined to be a potential enemy pair if two, three, and/or four congruence values, for different dimensions of similarity, exceed the respective threshold congruence values for each corresponding dimension of similarity.

In some examples, cosine-based congruence values for each dimension may be numerical values between 0 and 1. In some examples, the threshold value may be set between about 0.5 and about 0.99. In some examples, the threshold values may be tuned via user input, or hard coded, based on user preference. In some examples, threshold values may be different for each dimension of similarity. In some examples, threshold values may be set between about 0.7 and 0.9.

By way of example, a first examination item and second examination item may exhibit congruence values across multiple dimensions, e.g.:

Lexical similarity: 0.40
Syntactic similarity: 0.22
Semantic similarity: 0.84
Construct similarity: 0.08

In the foregoing example, if the threshold congruence value were more than 0.4 (i.e., 0.75), then the pair of examination items would be flagged as a potential enemy items in the semantic similarity dimension because the semantic similarity value of 0.84 indicates that the two items are about very similar topics. In other examples, a pair of examination items may be flagged as a potential enemy pair only if more than one congruence value exceeds a threshold value.

Once a potential enemy item pair is identified, the method 250 may include removing an examination item of the enemy item pair from the digital examination. Removing the examination item may include displaying the potential enemy item pair on a graphical user interface and obtaining from the graphical user interface an indication confirming that the potential enemy item pair is a confirmed enemy item pair. A further indication deleting a target enemy item from the enemy item pair may be obtained from the graphical user interface. Alternatively, the method may include automatically selecting one of the enemy items from the enemy item pair for removal from the digital examination.

Figure 2B:
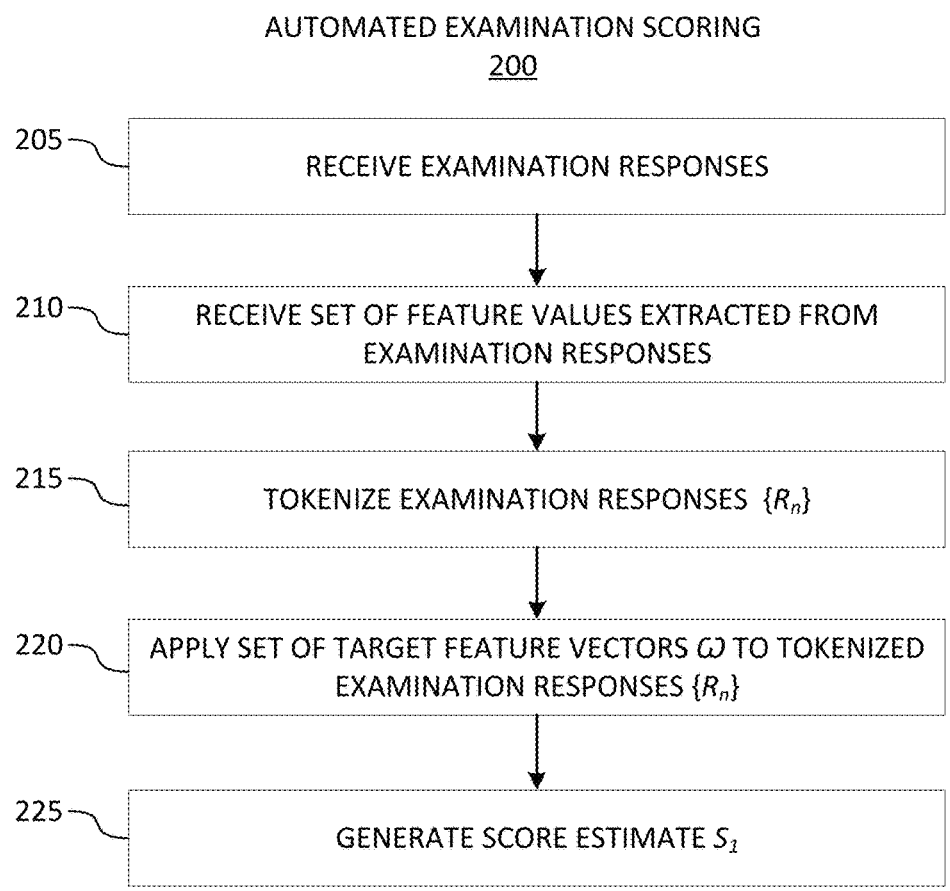
FIG. 2B is a flow chart illustrating an example method for automated examination scoring, consistent with embodiments disclosed herein.

FIG. 2B is a flow chart illustrating an example method for automated examination scoring in accordance with one embodiment of the systems and methods described herein. In some embodiments, an automated examination scoring method 200 may include receiving a set of examination responses at step 205 and receiving a set of features extracted from the examination responses at step 210. For example, the set of features may include response n-grams, semantic word vectors, and NLP features (including measures of vocabulary difficulty, lexical diversity, proposition density, word and sentence complexity, etc.) As used herein, n-grams may be a plurality of related objects identified in a string of text within an examination response. For example, a 3-gram may be a string of three words present in the response (e.g., "three little bears"). The set of feature vectors may include a combination of holistic construct-relevant features with word n-grams and semantic vectors in one high-dimensional predictor matrix.

Particular n-grams may be expected within a particular examination response according to the set of scoring rules. And n-gram may also be related to grammar or parts of speech. For example, an n-gram may be a pre-identified sequence of verbs, nouns, adverbs, or adjectives (e.g., an n-gram including an adjective-noun-adverb-verb sequence). Some n-grams may include synonyms, antonyms, homonyms, or the like. Some n-grams vectors may be assigned negative, as opposed to positive relevance coefficients. For example, a 3-gram that includes synonyms may be assigned a positive relevance coefficient (as to raise an overall examination response score), whereas a 3-gram that includes antonyms or homonyms may be assigned a negative relevance coefficient (as to lower an overall examination response score).

Some n-grams may be sequences of words including a predefined number or range of syllables, or sentences including a predefined number or range of words. Sets of n-grams may be specific to certain topics, such as history, science, literature, popular culture, or other topics as known in the art. A set of vocabulary related n-grams may also be grouped by context, grade level, geography, or other factors and may color the types of vocabulary used by a particular test taker.

N-grams may be grouped in various sizes. For example, n-grams may be unigrams, bigrams, trigrams, 4-grams, etc. In the case of vocabulary, a unigram may be a single word. A bigram may be a string of two words, a trigram may be a string of three words, etc. Similarly, unigrams, bigrams, trigrams, 4-grams, and the like may be strings of characters, words, terms, phrases, or sentences from the response. They may also include specific patterns of parts-of-speech, numbers of letters or syllables, contextual relevance (e.g., based on frequency within a particular corpus or topic-related database), level of vocabulary, or other related metrics.

In some embodiments, feature vectors may include n-grams and other scoring relevant information associated with the response. The automated examination scoring method 200 may select which feature vectors to evaluate based on a randomization parameter and in which order to apply them based on the reduction in error. For example, the method may apply a stochastic gradient boosting engine using a randomization parameter to make a determination as to which feature vectors to evaluate in the set of examination responses.

The stochastic gradient boosting method may be used to assist in the process of training an prediction and learning engine disclosed herein. Accordingly, in some embodiments, feature vectors may be evaluated in a predetermined order, and each with a predetermined weight, to determine the most probable score for a particular examination. In other embodiments, the order in which feature vectors are evaluated may change according to the stochastic gradient boosting method when applied to reduce the error between engine-predicted scores and human reference scores. Still in other embodiments, some feature vectors may not be evaluated at all on a given application of the automated examination scoring method 200. In some examples, feature vectors may be non-homogenous, as to include mixes of holistic measures, word n-grams, part-of-speech n-grams, semantic similarity quantities, or other types of features in a single high-dimensional vector.

Together, a set of feature vectors may comprise a predictor matrix $\omega$. In initial applications of automated examination scoring method 200 to results from a particular examination, a target set of feature vectors may be selected from a set of previous examination scoring rules stored in data store 120, or input by a user through reviewer interface 140.

Still referring to FIG. 2, an automated examination scoring method 200 may also include tokenizing examination responses into words or sentences. The output from step 215 may be a tokenized set of examination responses $\{R_n\}$. The tokenized set of examination responses $\{R_n\}$ may be a set of n-word segments related to a particular section or sub topic within the examination, or may be related to the examination as a whole. Tokenizing the set of examination responses may include segmenting each examination response into one or more n-word segments. For example, an n-word segment may be a string of two or more consecutive words. The number of words in each segment may be predetermined and/or configured by a user through the reviewer interface, or may be included in the set of scoring rules.

Method 200 may further include learning and applying a set of scoring rules to the tokenized examination responses. For example, the set of scoring rules may include the target feature vectors. The scoring rules may be applied to the set of tokenized examination responses $\{R_n\}$ at step 220.

Feature vectors within the predictor matrix may be evaluated in a randomized order. In some examples, each feature vector may be evaluated by applying the stochastic gradient boosting method to generate a score estimate $S_1$ at step 225.

Figure 3A:
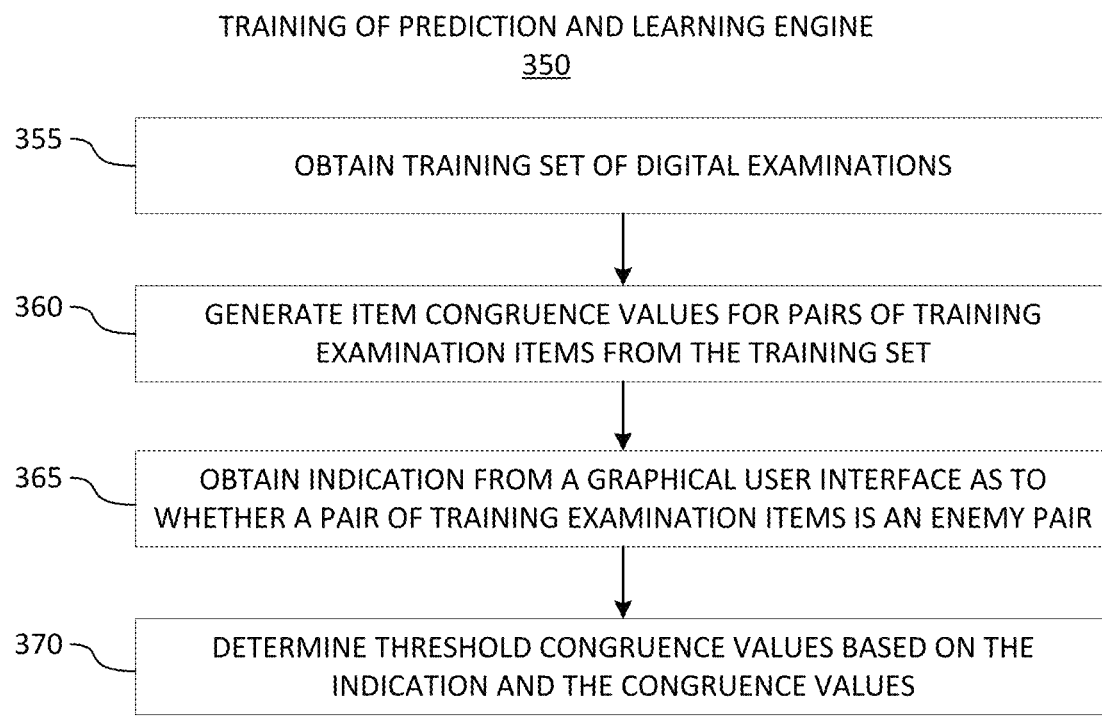
FIGS. 3A and 3B are flow charts illustrating example methods for training a prediction and learning engine, consistent with embodiments disclosed herein.

FIG. 3A is a flow chart illustrating an example method for training prediction and learning engine in accordance with one embodiment of the systems and methods described herein. As illustrated in FIG. 3A, method 350 may include obtaining a training set of digital examinations at 355. The training set may be a set of digital examination that include a subset of identified enemy item pairs and/or multiple non-enemy items. Method 350 may include generating item congruence values for pairs of training examination items from the training set of digital examinations at 360 and obtaining an indication from a graphical user interface as to whether the pair of training examination items is an enemy item pair at 365. The generation of congruence values may be performed by an item similarity prediction model, for example, a machine-learning model such as a gradient boosted decision tree, a convolutional neural network, or other machine-learning and/or deep learning algorithm. In some embodiments, method 350 includes determining threshold congruence values based on the indication obtained from the graphical user interface and the congruence values. The item similarity prediction model may modify parameters, such as threshold congruence values, and/or weighting coefficients for the congruence values across each respective similarity dimension, based on the indications obtained from the graphical user interface. In some embodiments, method 350 may also include applying the item similarity prediction model to real-world digital examination data to predictively identify potential enemy item pairs within the digital examinations.

Figure 3B:
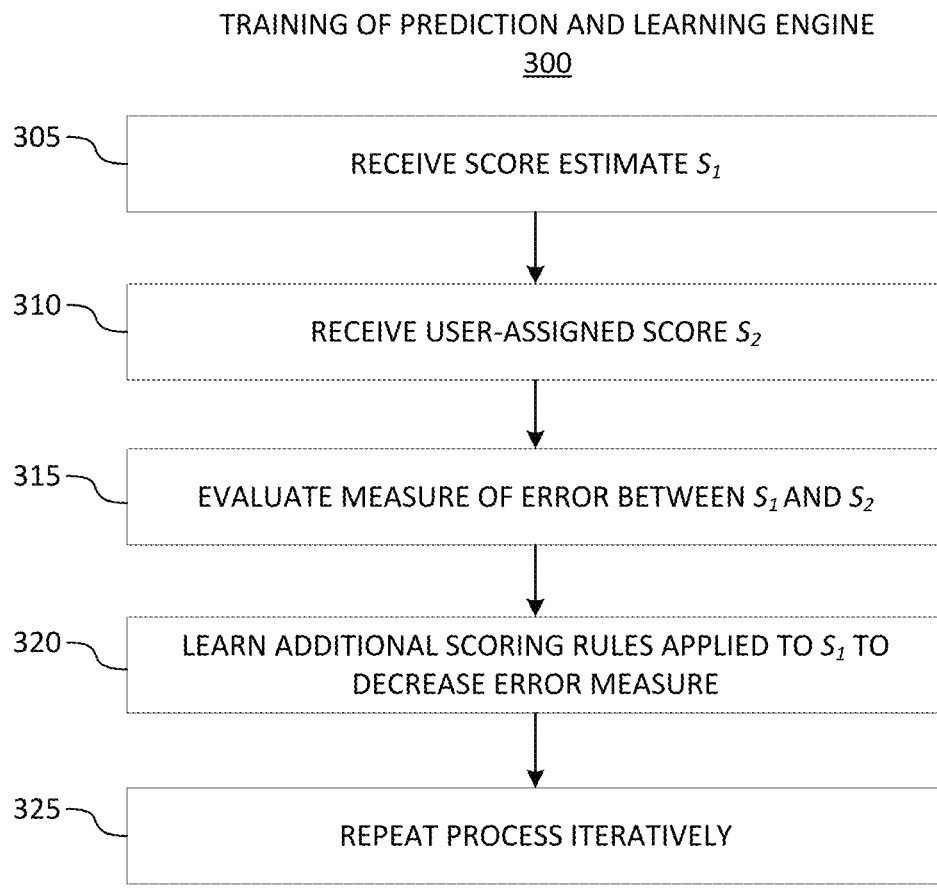

FIG. 3B is a flow chart illustrating an example method for training prediction and learning engine in accordance with one embodiment of the systems and methods described herein. In some embodiments, a method for training and prediction and learning engine 300 may include receiving a vector of score estimates $S_1$ at step 305 and receiving a vector of user assigned scores $S_2$ at step 310. Method 300 may then include observing the feature vectors while evaluating a measure of error between $S_1$ and $S_2$. Through applying stochastic gradient boosting, scoring rules may be added that adjust $S_1$ to reduce the observed error.

In some embodiments, method 300 may further include repeating steps 305 through 320 iteratively. Each time a new score estimate $S_1$ may be received, for example as an output of automated examination scoring method 200. Scoring estimate $S_1$ may then be compared to a previous, or a new user assigned score $S_2$, and a new measure of error. Use of the stochastic gradient boosting process may adjust the manner (e.g., the order according to a randomization parameter, application of, and weighting) in which the feature vectors of the tokenized examination responses are observed, such that a different score may be calculated through each run of the automated examination scoring method 200, even on the same set of examination responses. Part of the adjustment process, then, may include adjusting the randomization parameter as training becomes more refined, for example, through multiple iterations. An additional part of the process includes tuning the number of iterations to execute to attain an optimized automated examination scoring model. As a result, a tuned stochastic gradient boosted automated examination scoring model may be generated through multiple iterations of methods 200 and 300.

Figure 4A:
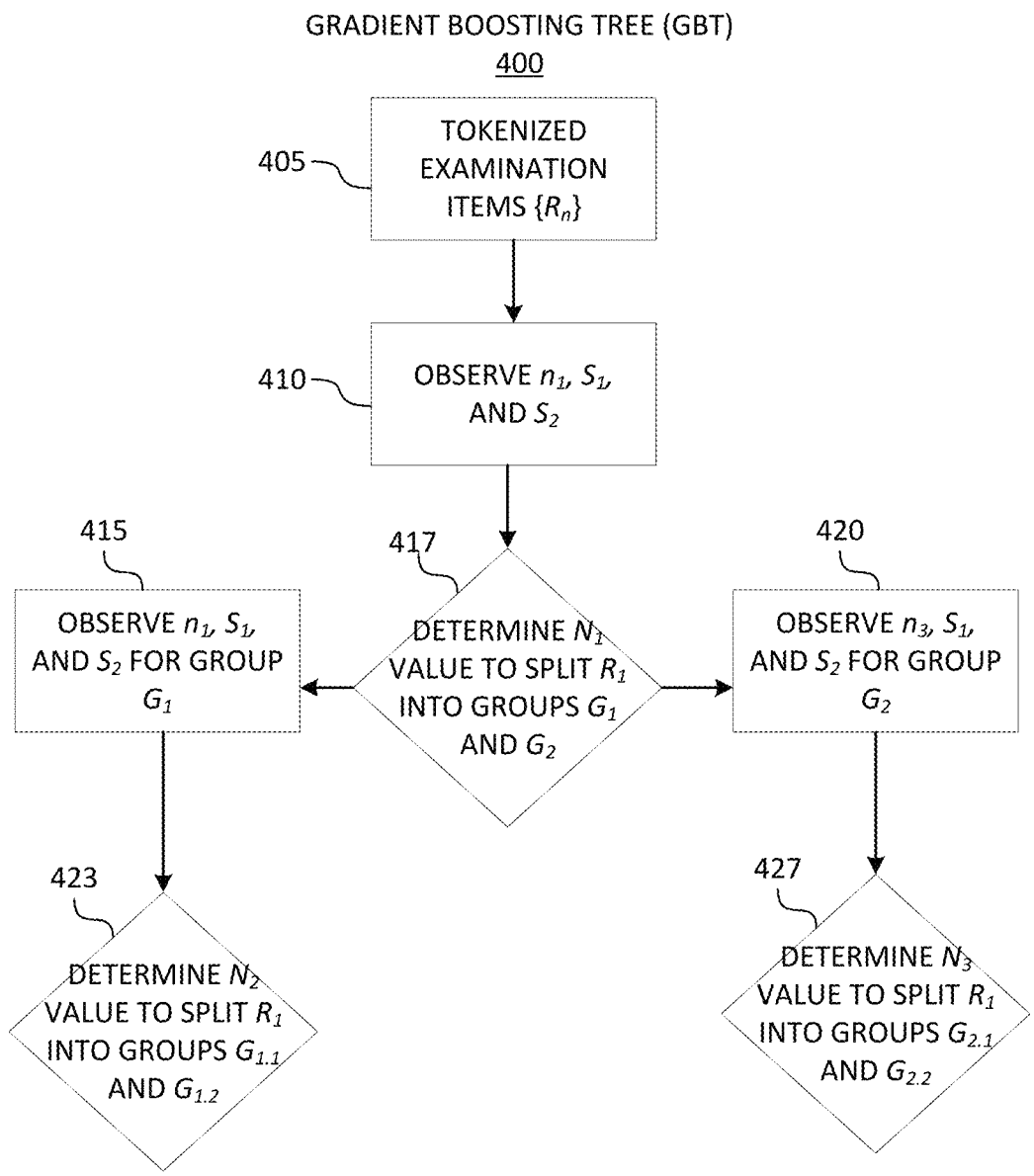
FIGS. 4A and 4B are flow charts illustrating an example methods for applying a gradient boosting tree (GBT) machine-learning model, consistent with embodiments disclosed herein.
Figure 4B:
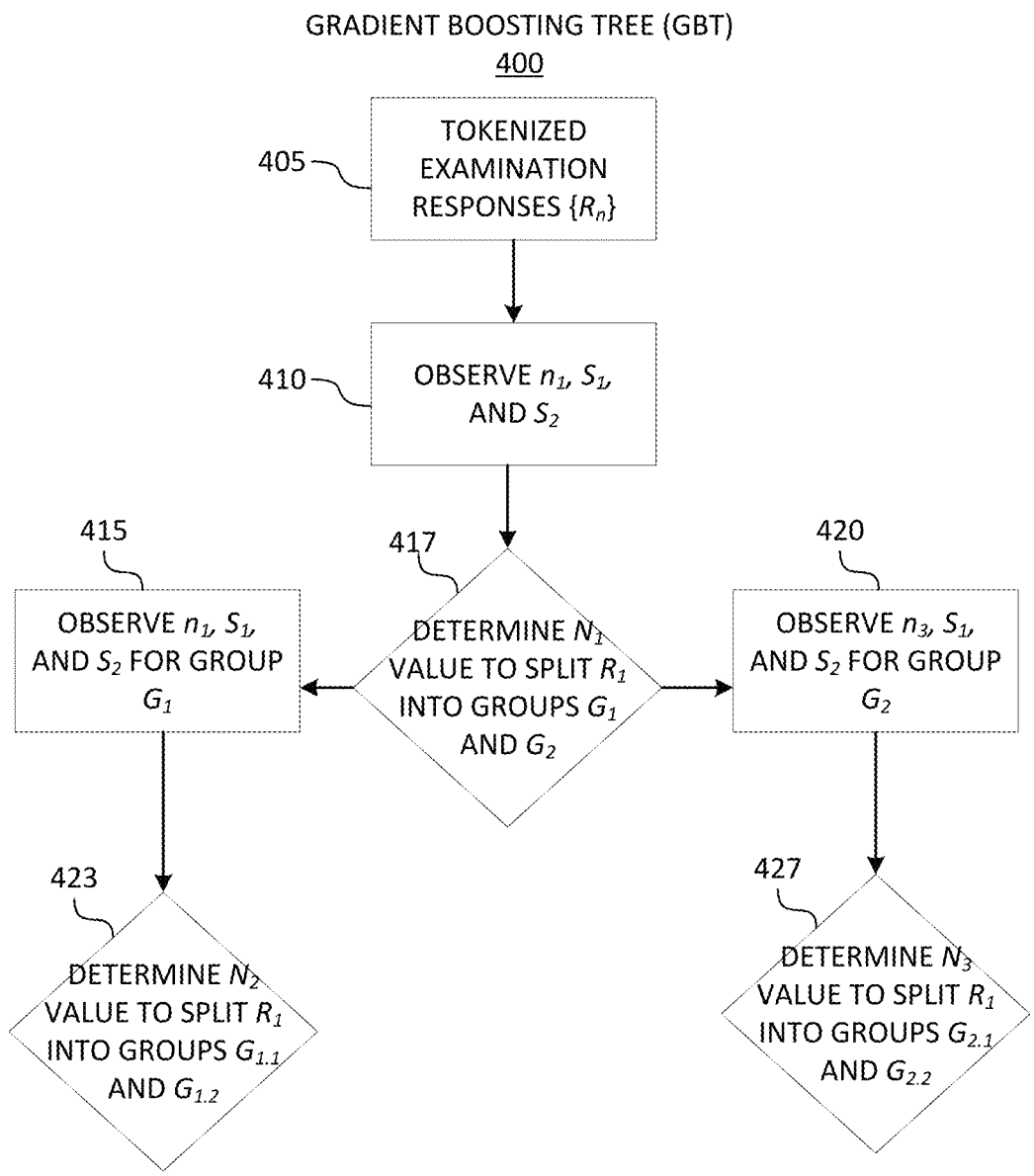

FIGS. 4A and 4B are flow charts illustrating an example method for applying a gradient boosting tree (GBT) to methods for automated determination of item similarity and/or automated examination scoring in accordance with one embodiment of the systems and methods described herein. An example GBT method 400 may include receiving a set of tokenized examination items and/or examination responses at step 405 and iteratively observing the predictor matrix for all examination items and/or responses. For example, in a first iteration at step 140, observe feature vector $N_1$, automated NLP Engine estimate $S_1$, and user input score $S_2$.

At step 417, determine what value of $N_1$ shall be used to split $R_1$ into groups, $G_1$ and $G_2$, whose scoring engine estimates $S_1$ are adjusted separately to improve error observed between $S_1$ and $S_2$. The decision tree may proceed by observing feature vector $N_1$ and determination is made of what value of feature n1 shall be used to split examination items and/or responses $R_1$ into groups whose automated prediction and learning engine estimates $S_1$ will be adjusted separately to improve the error observed between $S_1$ and $S_2$. This iterative process may progress down the decision tree at either step 423 or step 427 depending on which branch of the tree the algorithm proceeds down.

The decision tree may proceed at step 423 by observing feature vector $n_2$ and determination is made of what value of feature $N_2$ shall be used to split examination responses $R_1$ into groups whose automated prediction and learning engine estimates $S_1$ will be adjusted separately to improve the error observed between $S_1$ and $S_2$. On the other side of the tree, at step 427, a similar iterative process may proceed, taking the gradient boosting tree algorithm deeper and deeper down the decision tree. The order in which feature vectors may be evaluated may vary, for example, according to the estimates $S_1$ and feature vectors evaluated in previous sections of the tree, as well as according to the randomization parameter. Thus, the GBT method 400 may be tuned as part of the method for training the NLP Engine 300.

Figure 5:
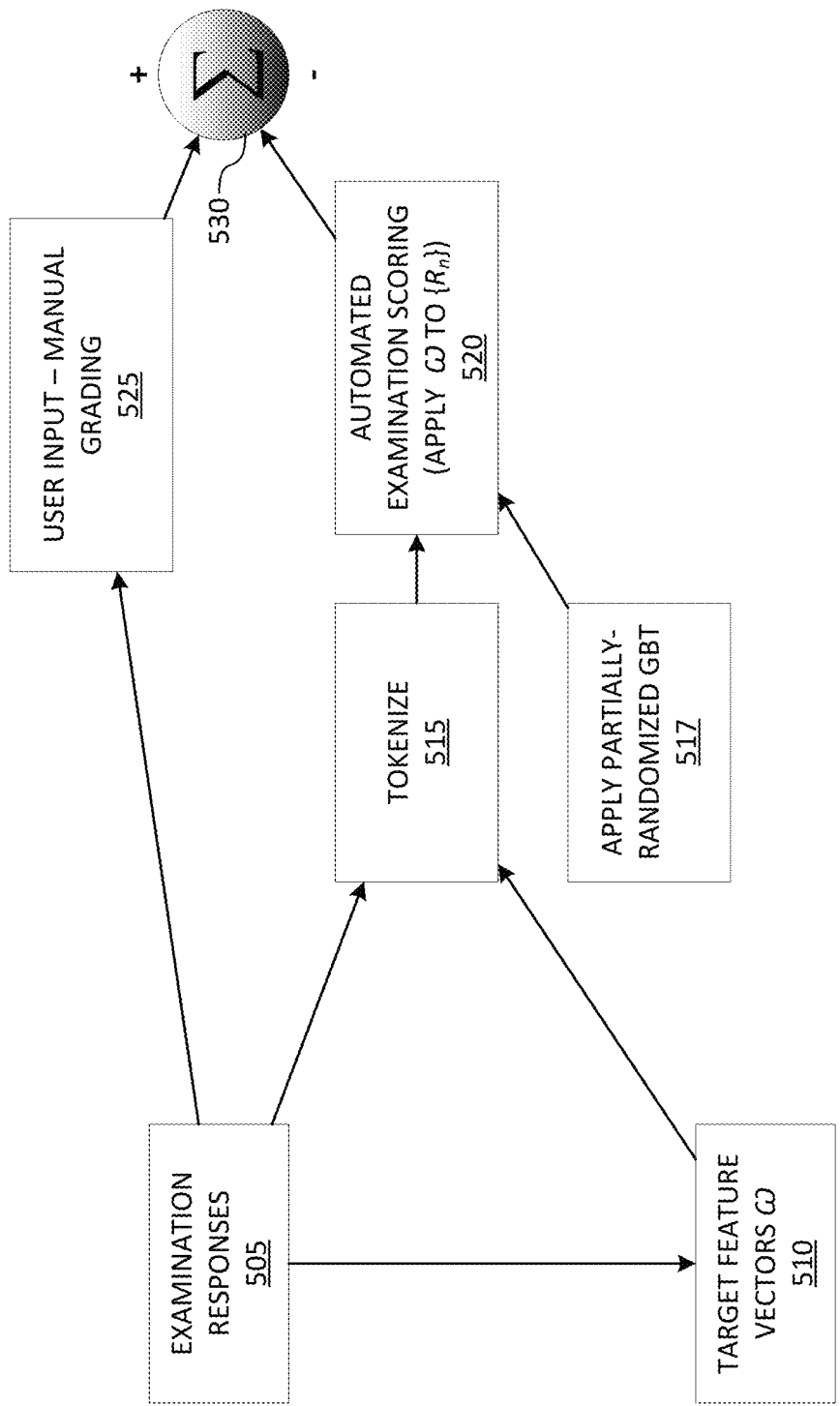
FIG. 5 illustrates an example method for automated examination scoring and training an prediction and learning engine, consistent with embodiments disclosed herein.

FIG. 5 illustrates an example method for automated examination scoring and training an prediction and learning. As illustrated, two inputs may be provided: (1) examination responses 505; and (2) a target set of feature vectors 510. The target set of feature vectors 510 may be derived from tokenized examination responses 515, as disclosed with respect to FIG. 2. In some embodiments, a partially randomized GBT 517 may be applied to target feature vectors at 520 to enhance the automated examination scoring estimates as disclosed with respect to FIG. 4.

A scoring estimate may then be provided to comparator 530. Comparator 530 may then return a measure of error between automated examination scoring estimates and human rater reference scores. As illustrated, this process may be iteratively applied to tune prediction and learning engine 126. In some examples, prediction and learning engine 126 may be tuned using this iterative process across a large subset of examination responses. For example, if a large group of students takes the same examination, a first subset of that group of examination responses may be used to tune prediction and learning engine 126.

Once tuned, prediction and learning engine 126 may be used to score the remaining group of validation test set examination responses, in order to validate that the scoring engine is producing scores that are sufficiently well-aligned to human scores. This occurs without user input, or at least without substantial user input, as some scores may still be spot-checked for quality assurance purposes. In some examples, after the algorithm hyperparameters of prediction and learning engine 126 are tuned, the first subset of examination responses may be re-scored to provide a more accurate result.

In some examples, prediction and learning engine 126 logs all scoring results, along with the respective set of scoring rules detailing the computational prediction process, inclusive of the feature vector space used to accomplish the scoring, to data store 120. Accordingly, in the event a dispute arises involving a disagreement over a particular score of a particular examination response, the log may be retrieved and reviewed to determine exactly how the score was calculated. If an error is determined, prediction and learning engine 126 may be re-tuned.

Figure 6:
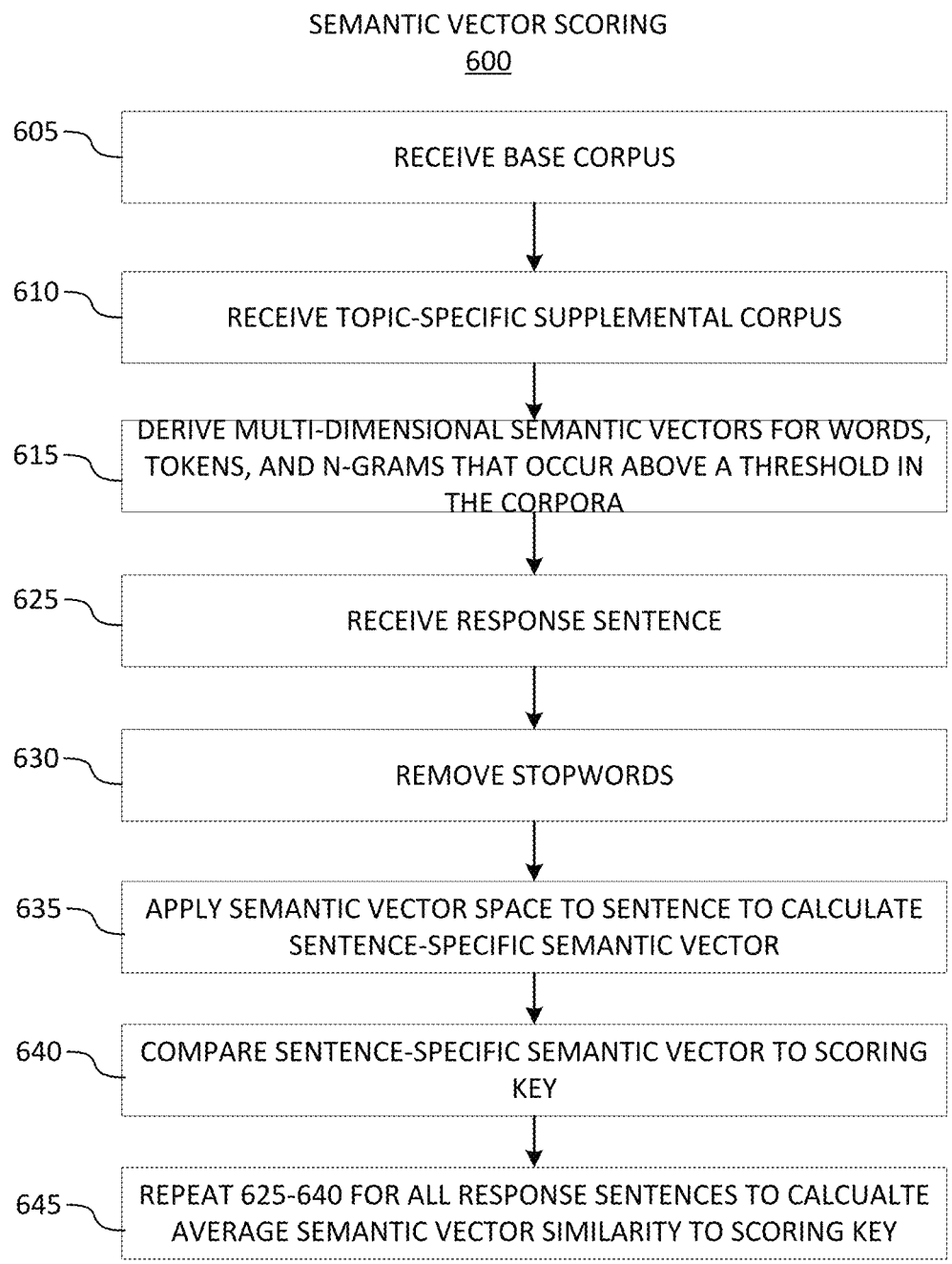
FIG. 6 is a flow chart illustrating an example method for semantic vector scoring, consistent with embodiments disclosed herein.

FIG. 6 is a flow chart illustrating an example method for the semantic vector component of scoring. As illustrated, a method for semantic vector scoring 600 may include receiving a base corpus of vocabulary at step 605. For example, the base corpus may be a general encyclopedia of vocabulary, such as the Corpus of Contemporary American English, Wikipedia, or other large corpora. Semantic vector scoring method 600 may also include receiving a topic specific supplemental corpus at step 610. For example, the topic specific supplemental corpus may be specific to a particular subject, such as science, literature, history, or other relevant topics. The topic may be more granular (e.g., biology, chemistry, physics, etc.), and multiple supplemental corpuses may be used.

A semantic vector scoring method 600 may further include deriving a multidimensional semantic vector space from the available corpuses at step 615, such that a vector in semantic space is derived for each word in the corpus using a word embedding method known in the art (e.g., word2vec or GLoVE). Word vectors that are near in semantic space correspond to words that are near in meaning.

The semantic vector scoring method 600 may also include receiving an examination response at step 625. For example, the examination response may be a response sentence or sentences from a full examination response. The method may further include pre-processing the examination response at step 630. For example, pre-processing the examination response may include tokenizing the response into words and sentences, and removing "stop words," such as commonly appearing words (e.g., "the", "a", "it", etc.) which are not relevant to the scoring analysis. Pre-processing the examination response may also include spell checking the examination response. Once the pre-processing is completed, semantic vector scoring method 600 may include deriving a semantic vector for each sentence in the response by averaging the semantic vectors of the words comprising the sentence.

The method may then include comparing sentence semantic vectors for the examinee response to similarly derived sentence semantic vectors from a scoring key (i.e., an exemplar training response with a particular score, used for training human scorers), at step 640. For example, the scoring key may be an example training essay response at the "3" score point.

The cosine similarity values for each sentence pair or segment may be compiled into a semantic vector scoring matrix representing the overall sentence similarities between the examination response and a scoring key.

In some examples, the cosine similarity values for each sentence or segment may be identified, for example, as a similarity score, p. An average score for the response sentence may be generated. In some examples, the average of the p greatest pairwise sentence similarity quantities (pairing each sentence from the examinee response with each sentence from the training response) may then be used as an overall response similarity quantity.

The process may be repeated iteratively for multiple response sentences to calculate an average semantic vector similarity with respect to the scoring key at step 645. Each of the response sentences within an examination response may be averaged or summed to calculate a final score.

Figure 7:
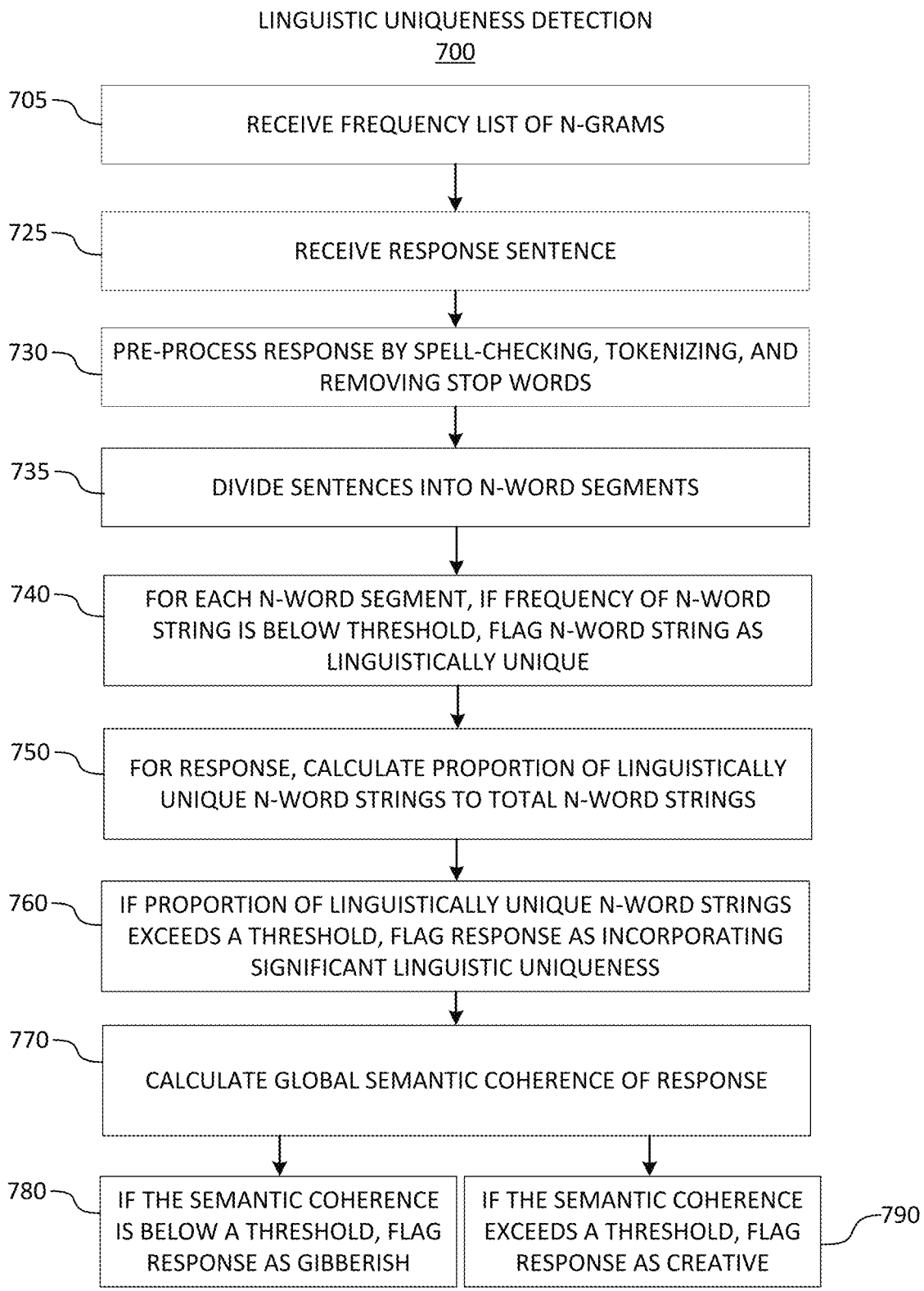
FIG. 7 is a flow chart illustrating an example method for detecting linguistic uniqueness, consistent with embodiments disclosed herein.

FIG. 7 is a flow chart illustrating an example method for detecting linguistic uniqueness, whether undesirable (gibberish) or desirable (creativity). As used herein, gibberish may be words, phrases, or sentences that are unrelated or nonresponsive to the examination question. In some examples, linguistically uncommon terms are entered by a test-taker to "game" the system. This is because many automated examination evaluation systems look for non-contextual length-based score indicators, such as numbers of words, numbers of syllables, numbers of characters, etc. A test-taker may know that these types of scoring indicators are in place and attempt to write sentences with large numbers of multi-syllable words, for example, to improve the test-taker's score, even though the answer itself is nonresponsive to the question.

As illustrated, a method for detecting linguistic uniqueness 700 may include receiving a list at step 705. The list may include n-grams from one or more language corpuses. The frequency that any particular n-gram appears in the corpus may be included as a parameter stored with each n-gram in the list. In some examples, if an n-gram appears below a threshold frequency in a particular corpus, the n-gram is not included in the list.

The linguistic uniqueness detection method 700 may also include receiving an examination response at step 725. For example, the examination response may be a response sentence or sentences from a full examination response. The method may further include pre-processing the examination response at step 730. For example, pre-processing the examination response may include tokenizing the response into words and sentences, and removing "stop words," such as commonly appearing words (e.g., "the", "a", "it", etc.) which are not relevant to the scoring analysis. Pre-processing the examination response may also include spell checking the examination response.

Once the filtering is completed, linguistic uniqueness detection method 700 may include dividing the examination response into n-word segments (e.g., one or more n-word segments may be identified within each sentence) at step 735. The method may also include flagging examination response sentence(s) as potentially incorporating linguistic uniqueness if any of the n-word segments match an n-gram stored in the list with a frequency value that falls below a threshold value. Accordingly, terms or phrases that are rarely or never found in available corpuses (e.g., vocabulary databases) may be flagged as potentially containing linguistic uniqueness. A user may then review the flagged results and make a determination as to whether the flagged terms are gibberish or are highly creative, but coherent answers.

In some examples, method for detection of linguistic uniqueness 700 may also include determining whether an essay includes unusually original or creative writing, as opposed to gibberish. For example, an essay including unusual phrasing may signify gibberish in some cases, or high creativity in others. To distinguish between gibberish and high creativity, the method for linguistic uniqueness detection 700 may include determining whether examination response sentences include n-word segments that do not appear frequently within a corpus. If such n-word segments are detected within the examination response sentence, the method may include calculating sematic coherence of the suspect n-word segment with other n-grams identified with high frequency within the corpus.

Semantic coherence is a measure of the interrelatedness of parts of the text. The methods may compare overlap in words and word meanings to calculate a semantic coherence coefficient. If an examination response includes multiple n-word segments that do not appear frequently in the base or target corpus, but which do exhibit high semantic coherence with other response n-grams that do appear frequently in either corpus, then the examination response may be flagged as highly creative, as opposed to incorporating gibberish. In some examples, a user may review examination responses flagged as including gibberish or being highly creative and indicate agreement or disagreement with the assessment. The reviewer's input may be incorporated into the system to adjust sensitivities to gibberish detection and/or high creativity detection.

Figure 8:
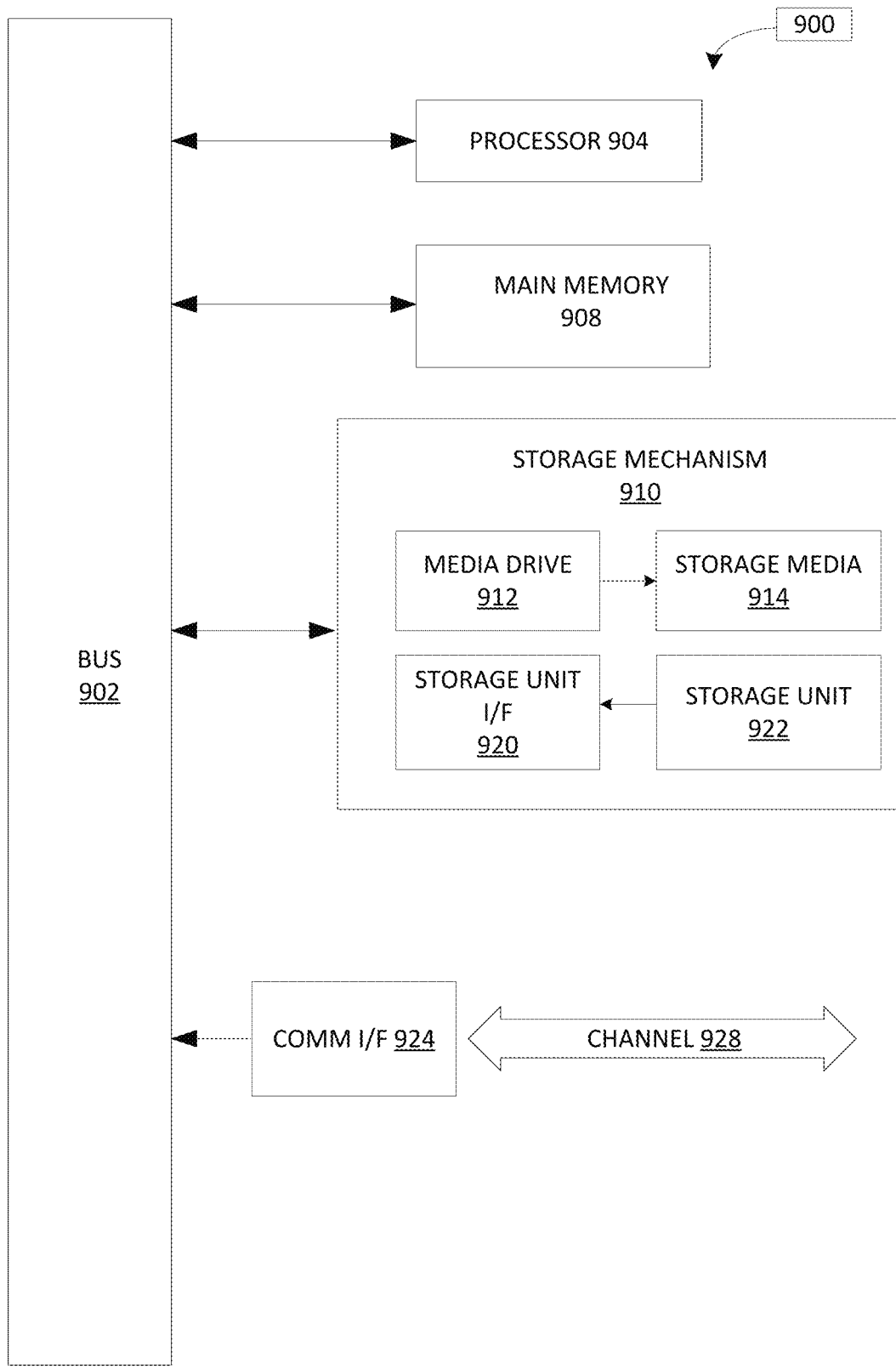
FIG. 8 illustrates an example computing system that may be used in implementing various features of embodiments of the disclosed technology.

As used herein, the term engine might describe a given unit of functionality that can be performed in accordance with one or more embodiments of the technology disclosed herein. As used herein, an engine might be implemented utilizing any form of hardware, software, or a combination thereof. For example, one or more processors, controllers, ASICs, PLAs, PALs, CPLDs, FPGAs, logical components, software routines or other mechanisms might be implemented to make up a engine. In implementation, the various engines described herein might be implemented as discrete engines or the functions and features described can be shared in part or in total among one or more engines. In other words, as would be apparent to one of ordinary skill in the art after reading this description, the various features and functionality described herein may be implemented in any given application and can be implemented in one or more separate or shared engines in various combinations and permutations. Even though various features or elements of functionality may be individually described or claimed as separate engines, one of ordinary skill in the art will understand that these features and functionality can be shared among one or more common software and hardware elements, and such description shall not require or imply that separate hardware or software components are used to implement such features or functionality.

Where components or engines of the technology are implemented in whole or in part using software, in one embodiment, these software elements can be implemented to operate with a computing or processing engine capable of carrying out the functionality described with respect thereto. One such example computing engine is shown in FIG. 8. Various embodiments are described in terms of this example computing engine 900. After reading this description, it will become apparent to a person skilled in the relevant art how to implement the technology using other computing engines or architectures.

Referring now to FIG. 8, computing system 900 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing engine 900 might also represent computing capabilities embedded within or otherwise available to a given device. For example, a computing engine might be found in other electronic devices such as, for example, digital cameras, navigation systems, cellular telephones, portable computing devices, modems, routers, WAPs, terminals and other electronic devices that might include some form of processing capability.

Computing system 900 might include, for example, one or more processors, controllers, control engines, or other processing devices, such as a processor 904. Processor 904 might be implemented using a general-purpose or special-purpose processing engine such as, for example, a microprocessor, controller, or other control logic. In the illustrated example, processor 904 is connected to a bus 902, although any communication medium can be used to facilitate interaction with other components of computing engine 900 or to communicate externally.

Computing system 900 might also include one or more memory engines, simply referred to herein as main memory 908. For example, preferably random access memory (RAM) or other dynamic memory, might be used for storing information and instructions to be executed by processor 904. Main memory 908 might also be used for storing temporary variables or other intermediate information during execution of instructions to be executed by processor 904. Computing engine 900 might likewise include a read only memory ("ROM") or other static storage device coupled to bus 902 for storing static information and instructions for processor 904.

The computing system 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a floppy disk drive, a magnetic tape drive, an optical disk drive, a CD or DVD drive (R or RW), or other removable or fixed media drive might be provided. Accordingly, storage media 914 might include, for example, a hard disk, a floppy disk, magnetic tape, cartridge, optical disk, a CD or DVD, or other fixed or removable medium that is read by, written to or accessed by media drive 912. As these examples illustrate, the storage media 914 can include a computer usable storage medium having stored therein computer software or data.

In alternative embodiments, information storage mechanism 190 might include other similar instrumentalities for allowing computer programs or other instructions or data to be loaded into computing engine 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory engine) and memory slot, a PCMCIA slot and card, and other fixed or removable storage units 922 and interfaces 920 that allow software and data to be transferred from the storage unit 922 to computing engine 900.

Computing engine 900 might also include a communications interface 924. Communications interface 924 might be used to allow software and data to be transferred between computing engine 900 and external devices. Examples of communications interface 924 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 924 might typically be carried on signals, which can be electronic, electromagnetic (which includes optical) or other signals capable of being exchanged by a given communications interface 924. These signals might be provided to communications interface 924 via a channel 928. This channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing engine 900 to perform features or functions of the disclosed technology as discussed herein.

Figure 9:
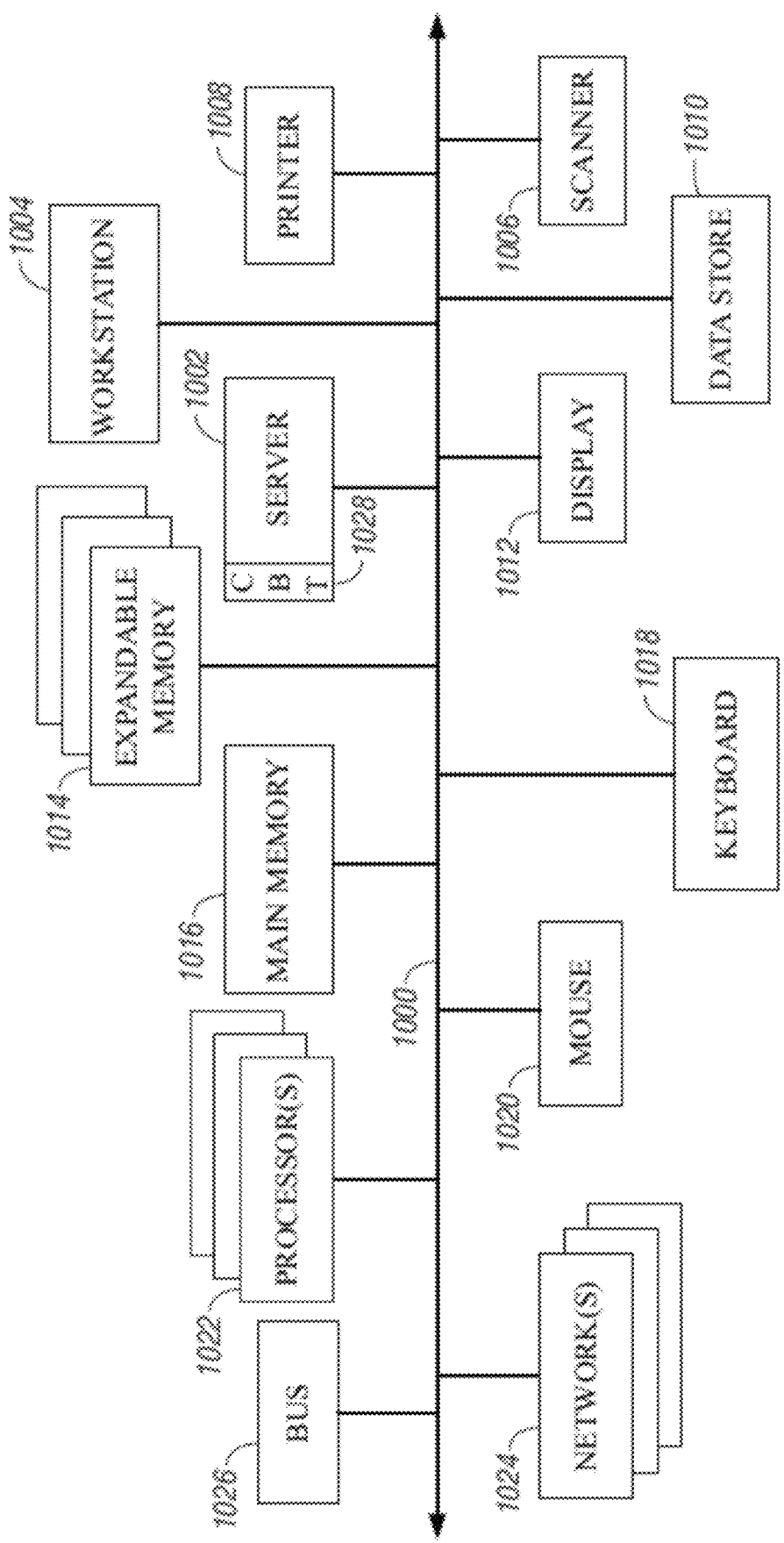
FIG. 9 is a block diagram for a computer network and system that may be used in implementing various features of embodiments of the disclosed technology.

FIG. 9 is a block diagram pictorially representing a computer network 1000 in which the disclosed embodiment of examination evaluation server 130 may be implemented. As shown in FIG. 9, the computer network 1000 includes, for example a server 1002, workstation 1004, scanner 1006, printer 1008, data store 1010, an expandable memory 1014, display 1012, keyboard 1018, main memory 1016, processors 1022, bus 1026, mouse 1020, and other like networks. The computer networks may be configured to provide a communication path for each device of the computer network to communicate with other like devices. Additionally, the computer networks 1024 may be the internet, a public switchable telephone network, a local area network, private wide area network, wireless network, or any of the like for communicating with an electronic device of the present invention.

In some embodiments of the disclosure, the server 1002 may be configured to execute any one or more of the protocols, processes or operations of this disclosure, provide outputs for display on the electronic device and receive inputs from the electronic device. In various other embodiments, the electronic device may be configured to execute any one or more operations associated with administering a test electronically or receiving responses to an exam electronically from a paper-delivered test booklet or cooperatively with one or more other electronic devices, computers, or workstations. A scanner 1006 may be configured to scan textual content and output the content into a computer readable format for one or more operations of the disclosure. Additionally, the printer 1008 may be configured to output the content from one or more operations of the disclosure, a score report, and scoring metrics on a media, such as paper. Furthermore, data associated with one or more operations of the present disclosure may be stored on a data store. The data store may be a local or a remote data store and may additionally be configured to receive and/or forward some or all of the stored data relating to an operation of the present disclosure. Moreover, in yet another embodiment, some or all of the operations, processes or procedures of the present disclosure may be subsumed within a single device, such as an electronic device.

Although FIG. 9 depicts a computer network, it is understood that the disclosure is not limited to operation with a computer network, but rather, the disclosure may be practiced in any suitable electronic device. Accordingly, the computer network depicted in FIG. 9 is for illustrative purposes only and thus is not meant to limit the disclosure in any respect.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent engine names other than those depicted herein can be applied to the various partitions.

Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "engine" does not imply that the components or functionality described or claimed as part of the engine are all configured in a common package. Indeed, any or all of the various components of a engine, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

We claim:

1. A computer implemented method for identifying and removing similar examination items in a digital examination, the method comprising:
   obtaining, with an examination evaluation server, the digital examination, the digital examination comprising a plurality of examination items;
   tokenizing a first examination item of the plurality of examination items into a first set of n-grams;
   tokenizing a second examination item of the plurality of examination items into a second set of n-grams;
   generating a first item vector from the first set of n-grams;

generating a second item vector from the second set of n-grams;

generating an item congruence value by comparing the first set of n-grams with the second set of n-grams;

determining a threshold value for identifying enemy item pairs using a machine learning model, the machine learning model comprising:

obtaining a training set of digital examinations, wherein each digital examination of the training set of digital examination comprises multiple training examination items;

determining, for pairs of training examination items, training item congruence values;

obtaining, from a graphical user interface, indications as to whether training examination items from the pairs of training examination items are enemy items; and determining the threshold value based on the congruence values and the indications; and identifying that the first and second examination items are a potential enemy item pair when the item congruence value exceeds the threshold value.

2. The method of claim 1, wherein the item congruence value comprises a cosine of an angle between the first item vector and the second item vector.

3. The method of claim 2, wherein the item congruence value further comprises a weighting coefficient applied to the cosine of the angle between the first item vector and the second item vector.

4. The method of claim 2, wherein the threshold value is about 0.75.

5. The method of claim 1, wherein the machine learning model is a convolutional neural network or a gradient boosted learning tree.

6. The method of claim 1, wherein generating the item congruence value comprises evaluating similarity between the first item vector and the second item vector relative to a target similarity dimension.

7. The method of claim 6, wherein the target similarity dimension comprises semantic similarity, syntactic similarity, lexical similarity, or content similarity.

8. The method of claim 7, further comprising applying a weighting coefficient to the item congruence value, the weighting coefficient being based on the target similarity dimension.

9. The method of claim 6, wherein the target similarity dimension comprises semantic similarity, syntactic similarity, lexical similarity, and content similarity.

10. The method of claim 9, wherein the identifying that the second examination item is the potential enemy item further comprises generating an array of congruence values, the array of congruence values comprising a semantic congruence value, a syntactic congruence value, a lexical congruence value, and a content congruence value.

11. The method of claim 10, further comprising:

displaying, on the graphical user interface, the potential enemy item and the array of congruence values;

obtaining, from the graphical user interface, an indication that the potential enemy item is a confirmed enemy item; and removing the confirmed enemy item from the digital examination.

12. The method of claim 1, further comprising determining that the potential enemy item is a confirmed enemy item and removing the confirmed enemy item from the digital examination.

13. The method of claim 12, wherein the determining that the potential enemy item is the confirmed enemy item comprises displaying, on the graphical user interface, the potential enemy item and obtaining, from the graphical user interface, an indication that the potential enemy item is the confirmed enemy item.

14. A system for enemy items from a digital examination, the system comprising:

an examination evaluation server;

a data store; and a graphical user interface;

wherein the examination evaluation server comprises a processor and a non-transitory computer readable medium with computer executable instructions embedded thereon, the computer executable instructions configured to cause the processor to:

obtain the digital examination comprising a plurality of examination items;

tokenize a first examination item of the plurality of examination items into a first set of n-grams;

tokenize a second examination item of the plurality of examination items into a second set of n-grams;

generate a first item vector from the first set of n-grams;

generate a second item vector from the second set of n-grams;

evaluate similarity between the first item vector and the second item vector relative to a first target similarity dimension to generate a first item congruence value;

evaluate similarity between the first set of n-grams and the second set of n-grams relative to a second target similarity dimension to generate a second item congruence value;

store the first and second item congruence values into an item congruence array located on the data store;

determine a first threshold value and a second threshold value using a machine learning logical circuit, wherein the machine learning logical circuit is configured to:

obtain a training set of digital examinations, wherein each digital examination of the training set of digital examinations comprises multiple training examination items;

determine, for pairs of training examination items, training item congruence values;

obtain, from the graphical user interface, indications as to whether training examination items from the pairs of training examination items are enemy items; and determine the first threshold value and the second threshold value based on the congruence values and the indications;

identify the second examination item as a potential enemy item if the first item congruence value exceeds the first threshold value and the second item congruence value exceeds the second threshold value; and cause the graphical user interface to display the digital examination without the potential enemy item.

15. The system of claim 14, wherein the first item congruence value is a cosine of an angle between the first item vector and the second item vector when evaluated relative to the first target similarity dimension and the second item congruence value is a cosine of an angle between the first item vector and the second item vector when evaluated relative to the second target similarity dimension.

16. The system of claim 14, wherein the machine learning logical circuit is further configured to apply a convolutional neural network or a gradient boosted learning tree.

17. The system of claim 14, wherein the first and second target similarity dimensions comprise semantic similarity, syntactic similarity, lexical similarity, or content similarity.

18. A computer implemented method for identifying and removing similar examination items in a digital examination, the method comprising:
- obtaining, with an examination evaluation server, the digital examination, the digital examination comprising a plurality of examination items;
- tokenizing a first examination item of the plurality of examination items into a first set of n-grams;
- tokenizing a second examination item of the plurality of examination items into a second set of n-grams;
- generating a first item vector from the first set of n-grams;
- generating a second item vector from the second set of n-grams;
- generating a semantic congruence value by evaluating semantic similarity between the first set of n-grams with the second set of n-grams;
- generating a syntactic congruence value by evaluating syntactic similarity between the first set of n-grams with the second set of n-grams;
- generating a lexical congruence value by evaluating lexical similarity between the first set of n-grams with the second set of n-grams;
- generating a content congruence value by evaluating content similarity between the first set of n-grams with the second set of n-grams, wherein the semantic congruence value, the syntactic congruence value, the lexical congruence value, or the content congruence value is generated using a machine learning model, the machine learning model comprising:
  - obtaining a training set of digital examinations, wherein each digital examination of the training set of digital examination comprises multiple training examination items;
  - determining, for pairs of training examination items, the semantic congruence value, the syntactic congruence value, the lexical congruence value, or the content congruence value using the machine learning model;
  - obtaining, from a graphical user interface, indications as to whether training examination items from the pairs of training examination items are enemy items; and
  - updating the semantic congruence value, the syntactic congruence value, the lexical congruence value, or the content congruence value based on the indications;
- storing the semantic, syntactic, lexical, and content congruence values in a congruence array; and
- identifying that the first examination item and the second examination item are a potential enemy item pair based on a comparison of the congruence array with an array of semantic, syntactic, lexical, and content threshold congruence values.

19. The method of claim 18, wherein the machine learning model is a convolutional neural network or a gradient boosted learning tree.

20. The method of claim 18, further comprising applying a weighting coefficient to the semantic congruence value, the syntactic congruence value, the lexical congruence value, or the content congruence value, the weighting coefficient being based on a target similarity dimension.

* * * * *